Figure 1:
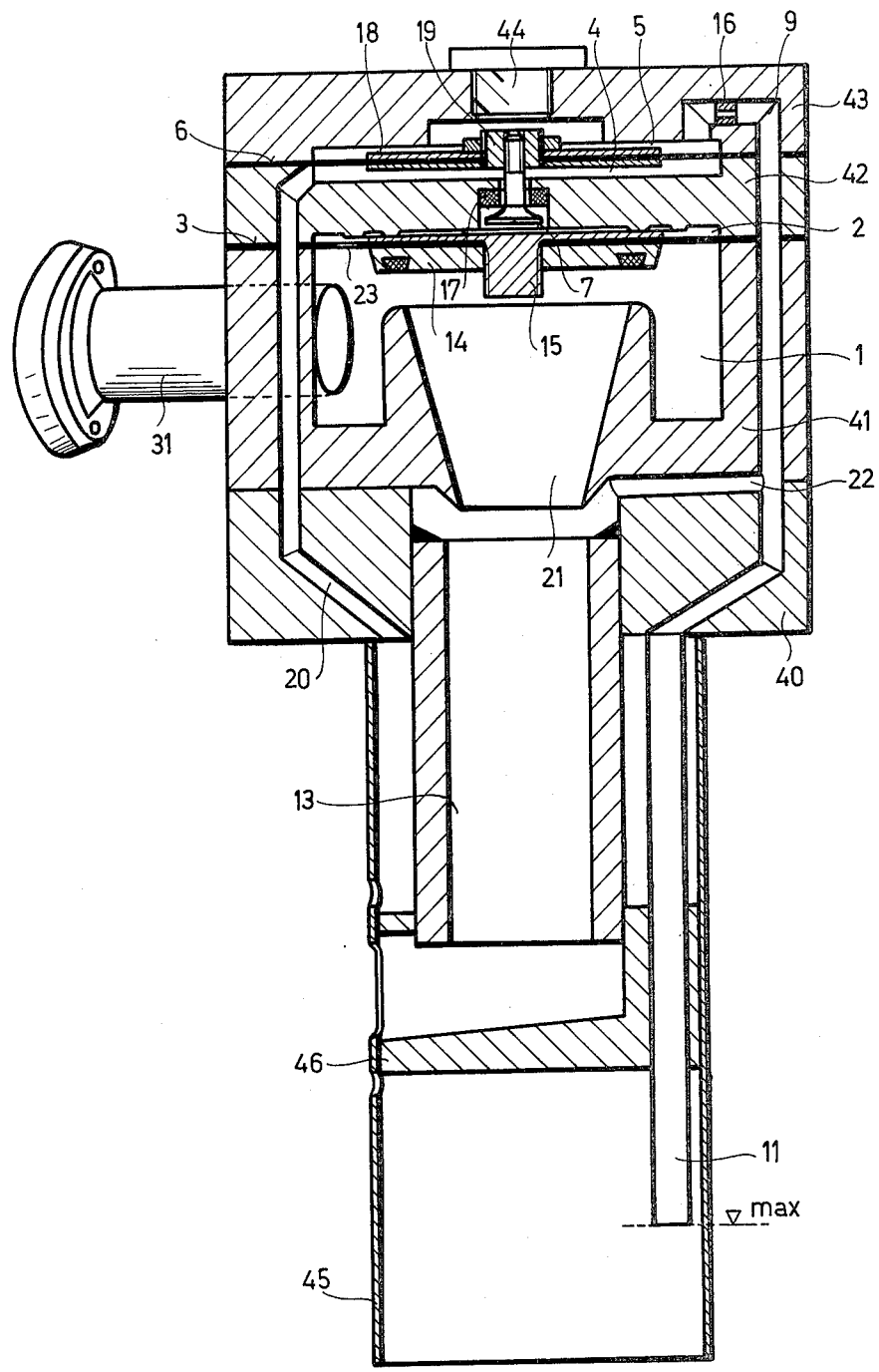

United States Patent [19]

Pataki et al.

[11] 4,292,996
[45] Oct. 6, 1981

[54] STOP VALVE

[75] Inventors: Jozsef Pataki; Jozsef Bucsi; István Bóna; Endre Szilvasi; András Gazdag; Antal Kóty, all of Budapest; Ferenc Hidvegi, Torokbalint, all of Hungary

[73] Assignee: OMUV Orvosi Muszer es Vasipari Szovetkezet, Torokbalint, Hungary

[21] Appl. No.: 87,714

[22] Filed: Oct. 24, 1979

[30] Foreign Application Priority Data

Oct. 24, 1978 [HU] Hungary .................. PA 1331

[51] Int. Cl.³ .................. F15C 1/14; F16K 21/18
[52] U.S. Cl. .................. 137/393; 73/290 R; 141/198
[58] Field of Search ............ 137/386, 389, 393, 842, 137/437; 73/290 R; 116/109; 141/198

[56] References Cited

U.S. PATENT DOCUMENTS

| | | | |
|---|---|---|---|
| 961,577 | 6/1910 | Bergmark | 137/393 |
| 2,626,006 | 1/1953 | Anderson | 137/393 |
| 2,967,542 | 1/1961 | Einer | 137/437 |
| 3,020,924 | 2/1962 | Davies | 137/386 |
| 3,242,940 | 3/1966 | Sirotek | 137/437 |
| 3,363,641 | 1/1968 | Mylander | 137/393 |
| 3,561,465 | 2/1971 | de Graaf | 137/386 |
| 4,024,887 | 5/1977 | McGregor | 137/386 |
| 4,161,188 | 7/1979 | Jorgensen | 137/393 |
| 4,191,208 | 3/1980 | Mylander | 141/198 |

FOREIGN PATENT DOCUMENTS 724416 2/1955 United Kingdom ............ 137/386

Primary Examiner—Martin P. Schwadron
Assistant Examiner—G. L. Walton

[57] ABSTRACT

A fully automatically operable pneumatic stop valve is provided which rests on the principle of pressure differences in its various membrane spaces in controlling the fluid flow through the valve, wherein the rising fluid closes a fluid level control pipe and thereby upsets the pressure conditions in an auxiliary valve membrane space which in turn controls the pressure in the main membrane space controlling the closing of the main valve.

3 Claims, 2 Drawing Figures

STOP VALVE

The invention relates to a stop valve which has an input stub and an exit opening provided in the valve housing and formed as a valve seat.

In many areas there is a need for such valves which are adapted for the filling of reservoirs, containers, etc. to a predetermined level or to keep up a certain predetermined maximum and a minimum fluid level in such reservoirs.

For setting the fluid level there is a solution known, according to which a swinging float is placed in the reservoir and which when a desired level is reached during the filling will close an electrical contact and will operate electrically the valve.

According to another known solution for the regulation of the filling or emptying of reservoirs a float is placed in the reservoir in a fashion appropriately supported, which float at a certain height of the fluid will close an electrical or a pneumatic contact and thereby it opens or closes the input valve at a desired predetermined minimum or maximum fluid level by using an auxiliary energy source which can be electrical or pneumatic.

There are also known level regulators which operate without auxiliary energy source, according to which the movement of the float is transmitted directly to the valve body by means of a mechanical transmission. In this case the float will open or close the input valve as a function of the level change.

In such solutions the so-called two-position valves are employed, which are either in the fully opened or fully closed state and can be opened by means of mechanical blocks and, as soon as the blocking has been discontinued, they close or some of them will close with the help of a spring or with the help of an auxiliary energy source.

The disadvantage of valves operating with auxiliary energy source resides in that the connection between the sensing means and the actuating means is assured by a pneumatic or electrical connection and, to this effect, there is the need to construct an appropriate network. Such approach will require considerable expenses, and for example, in the event the valves are used in an explosion sensitive areas, then appropriate protection of the electrical equipment should be provided for, which further adds to the cost.

The independent nature of the equipment will increase the possibility of defects and the repair of the equipment will require considerable skill. In the event of mechanical transmissions, the parts will undergo wear, the valve elements may become jammed, therefore, the possibility of defects further increases. The installation of such equipment is complicated and the area of their application is quite limited due to their space requirement and also due to the parts used in their construction.

It is an object of the present invention to eliminate the above-noted shortcomings and to provide such valves, the operation of which does not require auxiliary energy sources, therefore, there will be no need for the construction of an energy network for them. A further consideration is that the sensing and the actuating means are within the same unit, the construction and installation of which is simple and does not require special skills.

The invention is based on the recognition that the above-mentioned object can be satisfied if the valve is formed with various spaces which are then separated by membranes which membranes will move the closure member of the valve and also of the auxiliary valve according to the pressure relations which are present in the various valve spaces.

According to the present invention a stop valve is provided which has a valve housing having an input stub and an exit opening formed as a valve seat. The essence of our invention is that in the valve housing there is provided a membrane space opening upwardly, and an auxiliary valve housing provided with a membrane space opening from upward to downwardly and, at the upper side of the auxiliary valve housing there is provided a membrane space which is opening upwardly and which communicates with the lower membrane space of the auxiliary valve housing through an opening which includes the auxiliary valve seat, furthermore, the auxiliary valve housing is closed from above by means of a valve cover which contains a membrane space opening downwardly, and that the membrane spaces located between the valve housing and the auxiliary valve housing are separated by membranes which carry the valve disk and a flow-through aperature, whereas the membrane spaces located between the auxiliary valve housing and the valve cover are separated by membranes carrying the auxiliary valve disk and, furthermore that the exit opening is constructed in a tapering down fashion and to the bottom of which a suction pipe reaching the desired fluid level on the one hand is connected, and on the other hand a suction channel is connected which is in communication with the membrane space provided in the valve cover, whereas the membrane space located at the upper side of the auxiliary valve housing communicates with the liquid removing passage.

Our above described stop valve makes it possible that reservoirs can be filled to a predetermined level and to stop the filling of the fluid after such level has been reached and, all this, without using any auxiliary energy, relying only on the kinetic energy of the liquid, its pressure, or the pressure differences which result from the flow of the liquid.

The stop valve according to the present invention can be constructed also in a manner that it can be adapted for the setting of the minimum and maximum liquid levels within a reservoir, that is, wherein the valve will close after the maximum liquid level has been reached, and which will automatically open after the liquid level has sunk below a minimum value.

In order to attain the above, in the stop valve at its exit opening, at the lower end of the exit pipe connecting to the exit opening, there is provided an overflow container, to the bottom of the overflow container at one end thereof a double U pipe having different leg length is connected which, with its other end, communicates with the membrane space of the valve cover, and to the higher lying bottom part of which there is provided a bleeder aperture, while at the top portion thereof a bleeder pipe is connected.

In order to secure that the level of the liquid during filling the reservoir should be in relatively quiescent state, there is provided a spreading means at the lower end of the exit pipe connected to the exit opening which performs the spreading of the liquid in a horizontal manner. For the elimination of wave formation which still might be present in some cases, at the lower end of the suction pipe there is provided a wave breaking pipe.

The stop valve according to the present invention has no moving elements other than the flexible membranes, therefore, there is very little possibility for its malfunctioning or defects. For its use no special skills are required. It can be built into an existing pipe system.

Figure 2:
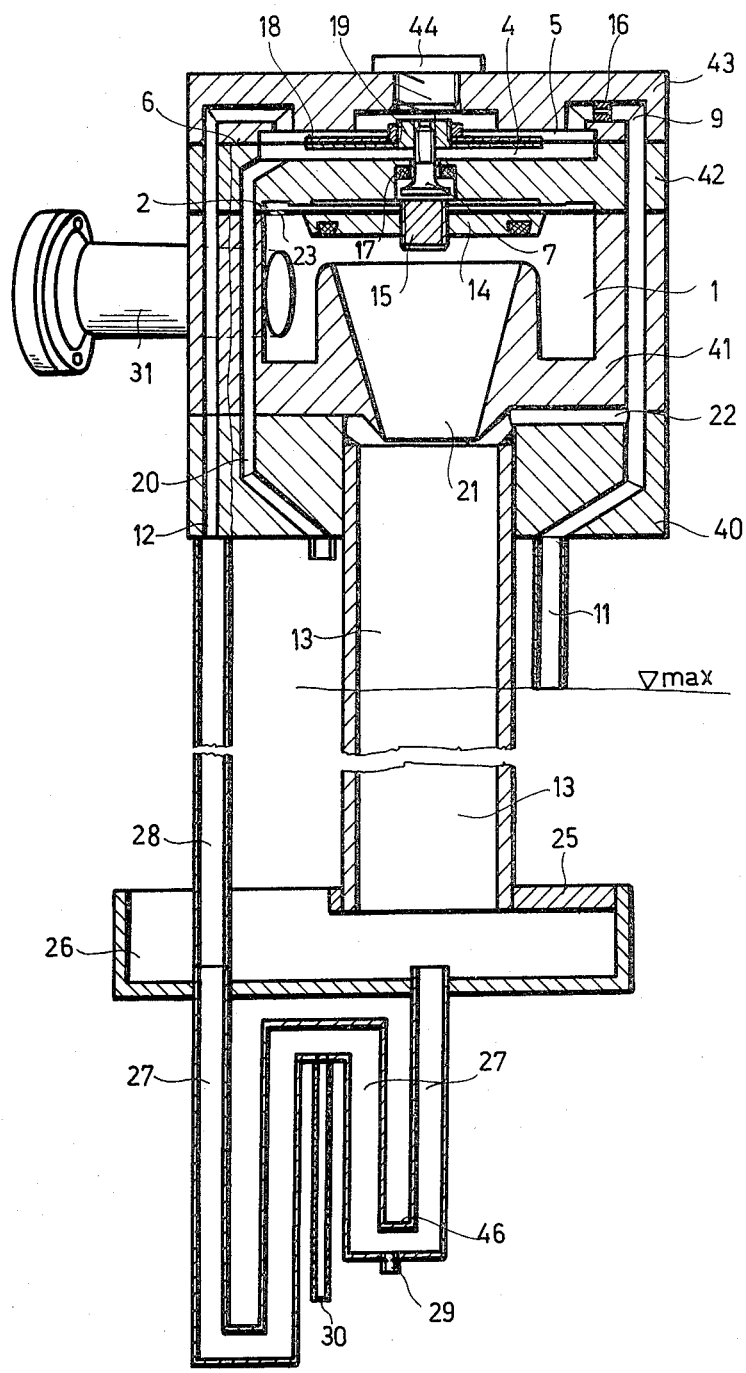

The invention is described in more detail on hand of embodiments in connection with the figures, in which:

FIG. 1 illustrates the stop valve according to the present invention in a constructional embodiment which functions as a filling valve, in a plain view section; and FIG. 2 illustrates the stop valve according to the present invention in an embodiment which functions as a level regulator, in section.

The housing of the stop valve as illustrated in FIG. 1 comprises four parts. The valve itself is included in a valve housing 41 above which there is an auxiliary valve housing 42 and which is closed from above by a valve cover 43. Under valve housing 41 there is provided or located the lower part of 40 of the valve housing. To valve housing 41 a input stub 31 is connected which inputs into it the liquid. within the valve housing 41 in its outer portion there is provided a membrane space having a larger cross-section and on the inside there is a membrane space 1 which has a smaller cross-section and which communicates with the exit opening 21. The upper part of the housing surrounding the exit opening 21 is formed as a valve seat, while the exit opening itself is constructed in a downwardly tapering fashion. The membrane space 1 opens upward. The auxiliary valve housing 42 including the membrane space 2 which opens downwardly and is located on the valve housing 41 includes also a membrane space 4 which opens upward. The valve cover 43 which closes the auxiliary valve housing 42 from above is provided with a membrane space 5 which opens downward.

The membrane space 1 located in the valve housing 42 and the membrane space 2 pointing downwardly in auxiliary valve housing 42 are separated by membrane 3 which is squeezed between the valve housing 41 and the auxiliary housing 42.

Through membrane 3 there is a hole 23 drilled and on membrane 15 with the help of a threaded plug a valve disk 14 is provided, which cooperates with the valve seat forming the upper side of the exit opening 21.

The membrane space 2 and the membrane space 4 of the auxiliary valve housing 42 communicate through an opening provided with a valve seat 17.

In the illustrated embodiment to the lower end of the exit opening 21 an exit pipe 13 is connected. The lower end of the exit opening 21 communicates with a suction pipe 22 which in turn communicates with the suction pipe 11 reaching to the desired fluid level on one hand, and on the other hand, it communicates with the membrane space 5 provided in the valve cover 43 and such communication being through a channel 9. In channel 9 there is provided a choke 16.

The membrane space 4 of the auxiliary valve housing 42 is communicating with a fluid removing passage 20 freely opening downwardly.

At the lower end of the exit stub 13 a diverting means 46 is formed which spreads the exiting liquid in a fan-like fashion, while suction pipe 11 is surrounded by a wave breaking pipe 45 which goes further down than the suction pipe 11. On the top of the valve cover 43 as can be seen in FIG. 1 the connecting spout 44 is closed by means of a threaded plug.

The stop valve according to FIG. 1 operates as follows:

The liquid under filling arrives in membrane space 1 through a hose or pipe which is connected to the input stub 31 and from then it flows through exit opening 21, exit pipe 13 into the reservoir which should be filled. The membrane space 1 has a cross-section which is tapering in the direction of the flow, and, as a result, in addition to the tapering cross-sectional area of the exit opening 21 there will be a fluid congestion which causes the filling of the membrane space 2 through the hole 23, while through the opening which includes the auxiliary valve seat 17, membrane space 4 will also fill up with the liquid. As a result, the pressure will be similar in membrane spaces 2 and 4. From membrane space 4 the liquid will freely flow into the reservoir through the liquid removing passage 20.

The liquid exiting at the lower portion of the exit opening 21 will form with suction pipes 11 and 22 a liquid sensor arrangement by exerting an injector-like suction effect through the suction pipe 22 which, as a result, through the suction pipe 11 will suck in air inasmuch as it cannot suck in anything from membrane space 5 through channel 9 as explained further hereinafter.

The liquid which comes through the exit pipe 13 as well as the spreading means 46 will continuously fill the reservoir.

When the liquid level of the reservoir will reach the lower portion of the suction pipe 11 reaching down to a predetermined depth, the suction passage 22 cannot suck in any more air through the suction pipe 11. At this time the air will be sucked out through channel 9 from the membrane space 5. Due to the decreasing pressure of the membrane space 5, the membrane 6 will be lifted up and it will press auxiliary valve disk 7 against the auxiliary valve seat 17, that is, it will close the auxiliary valve. Consequently, in membrane space 2 the pressure will increase which the membrane 3, that is, the valve disk 14 fixed there to will press against the valve seat of the exit opening 21, that is, the valve will close.

As long as the lower portion of the suction pipe 11 will reach down into the liquid, the stop valve despite any attempt to open it manually, it will immediately close down. The stop valve can be opened up through the threaded connection 44 mechanically or by applying a pressure pulse.

FIG. 2 illustrates the stop valve according to the present invention in the form of a liquid level regulator. The part of the stop valve which serves to set the maximum liquid level is entirely the same as the one shown in FIG. 1, therefore, their operation is also the same. For automatic liquid level regulation it is also essential that after the liquid level has reached the predetermined minimum level or well below it, the valve should automatically open and the filling should go on until the maximum liquid level is reached. For performing this function the stop valve according to the present invention will include the following additional elements. At the lower end of the exit pipe 13 an overflow-reservoir 26 is arranged which is partially covered by a cover 25. To the bottom of overflow reservoir 26 a dual U pipe 27 is connected, which has one branch which reaches downward to a lesser depth, and another branch which reaches downward to a further depth. The dual U pipe 27 at the other end communicates with membrane space 5 located in the valve cover 43 by means of a pipe 28 and through a pulse conduit 12. To the higher lying bottom of the dual U pipe 27 there is a bleeder opening 29 connected, while to a top lying bottom thereof there is connected a bleeder pipe 30 leading downward.

The operation of the stop valve illustrated in FIG. 2 in connection with a closing of the valve is not repeated because it is in full agreement with the already described closing operation discussed above. The difference is merely residing in that, that liquid arriving through the exit opening 13 will flow into the transit reservoir 26, from where by means of overflow it will get into the reservoir under filling, on the other hand, it will fill up the dual U pipe 27. From the dual U pipe 27 the air will go through pipe 28 partially into membrane space 5 and from there through a choke 16 it can leave on one hand, on the other hand, it can leave through the bleeder pipe 30. Considering that the bleeder opening 29 has a relatively small diameter, the liquid will fill up the dual U pipe 27 in a short time.

If in the reservoir the liquid level will decrease after the closure of the stop valve once the maximum liquid level has been reached, the liquid level will also start to decrease in the dual U pipe 27. Due to the structure of the dual U pipe 27 the liquid levels in it will not move similarly, but they will form a liquid seal which will move under the effect of the changing of the liquid level. The liquid column which will be upset due to the decreasing liquid level in the lower bottom portion of the dual U pipe 27 will through the impulse conduit 12 exert a suction on the membrane space 5 which will further increase the closing force exerted on the auxiliary valve 7, 17. After the decreasing liquid level has reached the level 46 in the upper lying portion of the dual U pipe, in such leg of the U the liquid seal will be interrupted and the liquid seal becomes upset in the leg of the dual U pipe which reaches further down, that is, there will be a pressure pulse suddenly exerted through the pulse conduit 12 and through pipe 28, which will press onto membrane 6, which in turn will open the auxiliary valve 7, 17. As a result the filling of the liquid will start again through the stop valve until the maximum level is reached again.

As can be seen from the illustrated embodiments, the stop valve according to the present invention has a simple construction and it can be closed or opened without the use of any auxiliary energy source. It solves the filling of reservoirs to a necessary level or their level regulation. It has a very wide area of application, it can be built into pipes operating under pressure, as a remotely controlled valve, it can also be used for the filling of barrels, containers, and also as a hand valve. In the event it is supplied with an appropriate temperature sensor it can be used as a two point temperature regulator in a cooling water pipe within a cooling network. Its construction and installation is very simple, its repair does not require any special skills. Due to the fact that it does not require any auxiliary energy to be supplied thereto, it can be operated advantageously in locations where the danger of explosion exist.

We claim:

1. A stop valve of the liquid level sensor type comprising a housing having an input stub, an exit opening (21) formed as a valve seat, characterized by a membrane space (1) opening upwardly and located in the valve housing (41), an auxiliary valve housing (42) with a membrane space (2) opening downward, on the upper side of the auxiliary valve housing (42) there is formed a membrane space (4) opening upward, and communicating with the lower membrane space (2) of the auxiliary valve housing (42) through a passage including the auxiliary valve seat (17), the auxiliary valve housing (42) is closed by a valve cover (43) including a membrane space (5) opening also downward, and the membrane spaces (1,2) located between the valve housing (41) and the auxiliary valve housing (42) are separated from each other by a membrane (3) carrying a main valve disc (14) and having a transit flow opening (23) therethrough, the membrane spaces (4,5) located between the auxiliary valve housing (42) and the valve cover (43) are separated from each other by a membrane (6) carrying auxiliary valve disc (7), a liquid level sensor means located within the valve housing and comprising said exit opening (21) constructed in a tapered fashion and extending beyond a portion of a suction pipe (11) and to the bottom part of which said suction pipe (11) reaching to the desired fluid level at the other end thereof is connected and, is in communication with the membrane space (5) located in the valve cover (43), said tapered exit opening (21) exerting an injector-like suction effect through said suction pipe (11) for sucking in only air as long as the mouth of said suction pipe (11) is open, the membrane space (4) located at the upper side of the auxiliary valve housing (42) communicates with a fluid removal passage (20) when the rising fluid level closes the lower opening of said suction pipe (11), a low pressure condition is created in the membrane space (5) of the auxiliary valve housing (42) for closing said auxiliary valve disc (7), when the pressure increases in membrane space (2) for forcing the membrane (3) with the disc (14) thereof against the valve seat of exit opening (21), thereby closing said main valve disc 14.

2. The stop valve according to claim 1, characterized by spreading means (46) formed at the lower end of an exit pipe (13) located under the exit opening (21) for the horizontal spreading of the fluid, the lower end of the suction pipe (11) is surrounded by a wave breaking pipe (45).

3. A stop valve of the liquid level sensor type comprising a housing having an input stub, an exit opening formed as a valve seat, characterized by a membrane space (1) opening upwardly and located in the valve housing (41), an auxiliary valve housing (42) with a membrane space (2) opening downward, on the upper side of the auxiliary valve housing (42) there is formed a membrane space (4) opening upward, and communicating with the lower membrane space (2) of the auxiliary valve housing (42) through an opening including the auxiliary valve seat (17), the auxiliary valve housing (42) is closed by a valve cover (43) including a membrane space (5) opening also downward, and the membrane spaces (1,2) located between the valve housing (41) and the auxiliary valve housing (42) are separated from each other by a membrane (3) carrying a main valve disc (14) and having a transit flow opening (23) therethrough, the membrane spaces (4,5) located between the auxiliary valve housing (42) and the valve cover (43) are separated from each other by a membrane (6) carrying auxiliary valve disc (7), the exit opening (21) is constructed in a tapered fashion, to the bottom part of which a suction pipe (11) reaching to the desired fluid level, is connected on one hand, and on the other hand to a branch suction pipe (22) which is in communication with the membrane space (5) located in the valve cover (43), the membrane space (4) located at the upper side of the auxiliary valve housing (42) communicates with a fluid removal passage when the rising fluid level closes the lower opening of said suction pipe (11), a low pressure condition is created in the membrane space (5) of the auxiliary valve housing (42) for closing said auxiliary valve disc (7), when the pressure increases in membrane space (2) for forcing the membrane (3) with the disc (14) thereof against the valve seat of exit opening (21), thereby closing said main valve disc (14), said stop valve being operable also as a level regulator, characterized by an overflow reservoir (26) placed at the bottom of an exit pipe (13) communicating with the exit opening (21), to the bottom of the overflow reservoir (26) there is connected with its one end a dual U-pipe (27) having legs of different length and communicating with membrane space (5) located in the valve cover (43) at its other end, the upper-lying bottom part of which is provided with a bleeder spout (29), and the top part of which is provided with a bleeder pipe (30).

* * * * *